(12) United States Patent
Xu (10) Patent No.: US 12,182,637 B2
(45) Date of Patent: Dec. 31, 2024

(54) METHOD, APPARATUSES AND COMPUTER-READABLE MEDIA RELATING TO EVENT SUBSCRIPTION IN A COMMUNICATION NETWORK

(71) Applicant: Telefonaktiebolaget LM Ericsson (publ), Stockholm (SE)

(72) Inventor: Wenliang Xu, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 99 days.

(21) Appl. No.: 17/762,989

(22) PCT Filed: Sep. 22, 2020

(86) PCT No.: PCT/EP2020/076444
§ 371 (c)(1),
(2) Date: Mar. 23, 2022

(87) PCT Pub. No.: WO2021/058489
PCT Pub. Date: Apr. 1, 2021

(65) Prior Publication Data
US 2023/0027164 A1    Jan. 26, 2023

(30) Foreign Application Priority Data

Sep. 26, 2019 (WO) ................ PCT/CN2019/108253

(51) Int. Cl.
*H04M 3/42* (2006.01)
*G06F 9/54* (2006.01)
*H04W 8/18* (2009.01)

(52) U.S. Cl.
CPC .............. *G06F 9/542* (2013.01); *G06F 9/546* (2013.01); *H04W 8/18* (2013.01)

(58) Field of Classification Search
None
See application file for complete search history.

(56) References Cited

U.S. PATENT DOCUMENTS

| 8,516,115 B2 * | 8/2013 | Westman | H04L 67/306 709/227 |
| 2010/0099447 A1 * | 4/2010 | Boberg | H04L 67/55 455/466 |

(Continued)

FOREIGN PATENT DOCUMENTS

| CN | 101867590 A * | 10/2010 | H04L 67/00 |

OTHER PUBLICATIONS

Author Unknown, "Technical Specification Group Services and System Aspects; Functional architecture and information flows to support Common API Framework for 3GPP Northbound APIs; Stage 2 (Release 16)," Technical Specification 23.222, Version 16.4.0, Jun. 2019, 3GPP Organizational Partners, 113 pages.

(Continued)

*Primary Examiner* — Christopher B Robinson
(74) *Attorney, Agent, or Firm* — Withrow & Terranova, PLLC (57) ABSTRACT

The disclosure provides methods, apparatus and computer-readable media for subscribing to, and receiving event notification messages from a CAPIF core function. In one method performed by a subscribing network entity, the subscribing network entity sends an event subscription request message to the CAPIF core function. The event subscription request message comprises an indication of an event filter to be utilized by the CAPIF core function for filtering event notifications to be sent to the subscribing network entity. The event filter comprises an identity of one or more network entities associated with events to be notified to the subscribing network entity.

7 Claims, 7 Drawing Sheets

(56) References Cited

U.S. PATENT DOCUMENTS

| | | | |
|---|---|---|---|
| 2018/0192390 A1* | 7/2018 | Li | H04W 4/50 |
| 2019/0261260 A1* | 8/2019 | Dao | H04W 48/00 |
| 2020/0089552 A1* | 3/2020 | Pattan | H04M 15/00 |

OTHER PUBLICATIONS

Author Unknown, "Technical Specification Group Services and System Aspects; System Architecture for the 5G System (5GS); Stage 2 (Release 16)," Technical Specification 23.501, Version 16.2.0, Sep. 2019, 3GPP Organizational Partners, 391 pages.

Author Unknown, "Technical Specification Group Services and System Aspects; Procedures for the 5G System (5GS); Stage 2 (Release 16)," Technical Specification 23.502, Version 16.2.0, Sep. 2019, 3GPP Organizational Partners, 525 pages.

Author Unknown, "Technical Specification Group Services and System Aspects; Architecture enhancements to facilitate communications with packet data networks and applications (Release 16)," Technical Specification 23.682, Version 16.3.0, Jun. 2019, 3GPP Organizational Partners, 132 pages.

Author Unknown, "Technical Specification Group Services and System Aspects; MBMS Extensions for Provisioning and Content Ingestion (Release 15)," Technical Report 26.981, Version 15.0.0, Jun. 2018, 3GPP Organizational Partners, 39 pages.

Author Unknown, "Technical Specification Group Core Network and Terminals; Common API Framework for 3GPP Northbound APIs; (Release 15)," Technical Specification 29.222, Version 15.4.0, Jun. 2019, 3GPP Organizational Partners, 114 pages.

Author Unknown, "Technical Specification Group Services and System Aspects; Generic Authentication Architecture (GAA); Access to network application functions using Hypertext Transfer Protocol over Transport Layer Security (HTTPS) (Release 15)," Technical Specification 32.222, Version 15.0.0, Jun. 2018, 3GPP Organizational Partners, 42 pages.

Ericsson, "C3-194462: Detailed information in CAPIF event notification," 3GPP TSG-CT WG3 Meeting #106, Oct. 7-11, 2019, Portoroz, Slovenia, 12 pages.

International Search Report and Written Opinion for International Patent Application No. PCT/EP2020/076444, mailed Nov. 5, 2020, 15 pages.

International Preliminary Report on Patentability for International Patent Application No. PCT/EP2020/076444, mailed Nov. 17, 2021, 22 pages.

\* cited by examiner

METHOD, APPARATUSES AND COMPUTER-READABLE MEDIA RELATING TO EVENT SUBSCRIPTION IN A COMMUNICATION NETWORK

This application is a 35 U.S.C. § 371 national phase filing of International Application No. PCT/EP2020/076444, filed Sep. 22, 2020, which claims the benefit of International Application PCT/CN2019/108253, filed Sep. 26, 2019, the disclosures of which are incorporated herein by reference in their entireties.

TECHNICAL FIELD

Embodiments of the disclosure generally relate to communication, and, more particularly, to methods and apparatuses for subscribing to receive event notifications in a communication network.

BACKGROUND

This section introduces aspects that may facilitate better understanding of the present disclosure. Accordingly, the statements of this section are to be read in this light and are not to be understood as admissions about what is in the prior art or what is not in the prior art.

Figure 1:
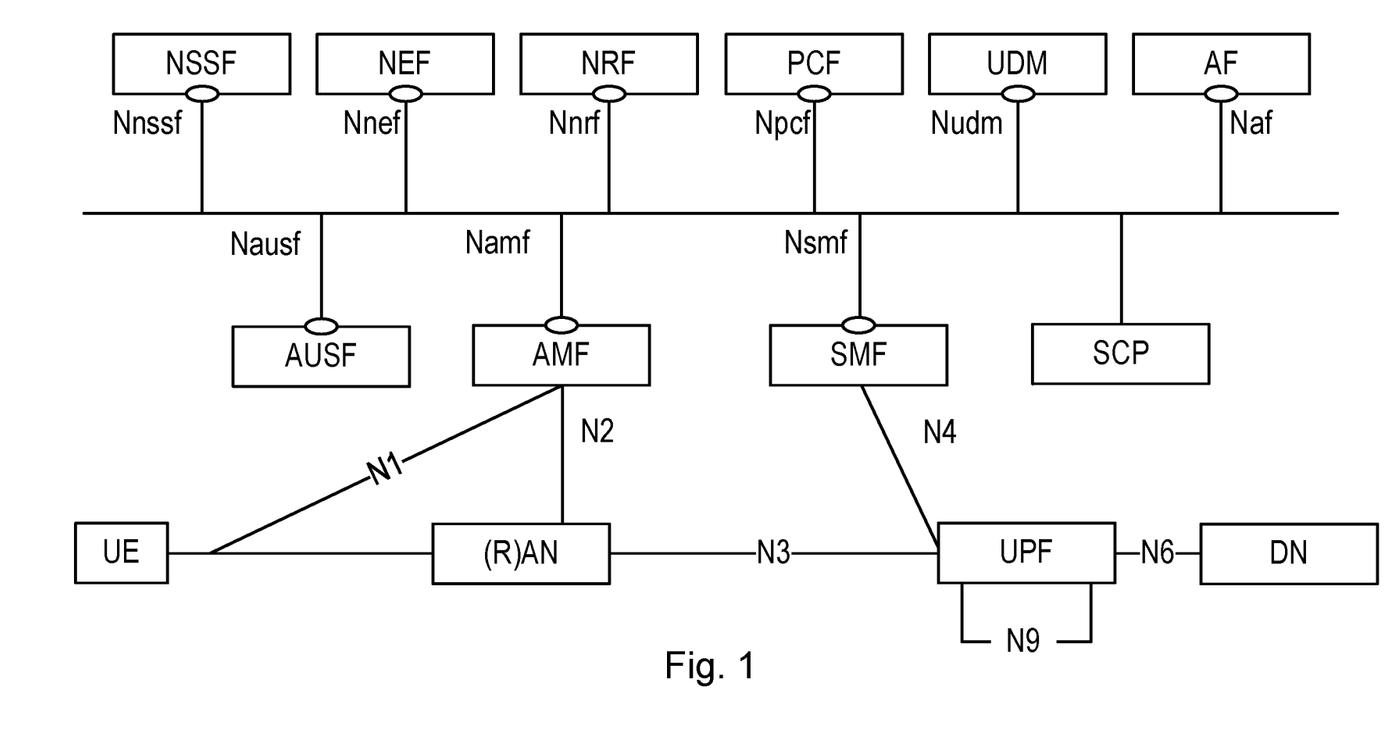
FIG. 1 is a diagram illustrating the architecture for the 5G system.

FIG. 1 illustrates the architecture for the 5th generation (5G) system. As shown, the 5G system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF).

The 5G architecture is defined as service-based and the interaction between network functions (NFs) is represented in two ways. One way is a service-based representation, where NFs (e.g. AMF) within the control plane enable other authorized NFs to access their services. This representation also includes point-to-point reference points where necessary. The other way is a reference point representation, which shows the interaction existing between the NF services in the NFs described by point-to-point reference point (e.g. N11) between any two NFs (e.g. AMF and SMF).

The NEF supports external exposure of capabilities of NFs. External exposure can be categorized as monitoring capability, provisioning capability, policy/charging capability and analytics reporting capability. The monitoring capability is for monitoring of specific event for UE in the 5G system and making such monitoring events information available for external exposure via the NEF. The provisioning capability is for allowing an external party to provision of information which can be used for the UE in the 5G system. The policy/charging capability is for handling quality of service (QoS) and charging policy for the UE based on the request from an external party. The analytics reporting capability is for allowing an external party to fetch or subscribe/unsubscribe to analytics information generated by the 5G system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for common application programming interface framework (CAPIF) event subscription and notification, which provides for more efficient usage of network resources.

According to a first aspect of the disclosure, there is provided a method performed by a subscribing network entity for subscribing to event notifications from a common application programming interface framework, CAPIF, core function in a telecommunications network. The method comprises: sending an event subscription request message to the CAPIF core function, the event subscription request message comprising an indication of an event filter, the event filter to be utilized by the CAPIF core function for filtering event notifications to be sent to the subscribing network entity, the event filter comprising an identity of one or more network entities associated with events to be notified to the subscribing network entity.

According to a second aspect of the disclosure, there is provided a method performed by a subscribing network entity for subscribing to event notifications from a common application programming interface framework, CAPIF, core function in a telecommunications network. The method comprises: sending an event subscription request message to the CAPIF core function, the event subscription request message comprising an indication of an event reporting requirement.

According to a third aspect of the disclosure, there is provided a method performed by a common application programming interface framework, CAPIF, core function, for notifying one or more subscribing entities of an event in a telecommunications network. The method comprises: sending an event notification message to the one or more subscribing entities, the event notification message notifying the one or more subscribing entities of an event, the event notification message comprising an indication of an identity of one or more network entities associated with the event.

Apparatuses and computer-readable media are also provided for performing the methods set out in the first, second and third aspects recited above.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Embodiments of the disclosure relate to the Common Application Programming Interface Framework (CAPIF) developed by the $3^{rd}$ Generation Partnership Project (3GPP). In 3GPP, there are multiple northbound API-related specifications (e.g. APIs for Service Capability Exposure Function (SCEF) functionalities defined in 3GPP TS 23.682 v 16.3.0, API for the interface between Multimedia Broadcast Multicast Services (MBMS) service provider and Broadcast Multicast Service Center (BM-SC) defined in 3GPP TR 26.981 v 15.0.0). To avoid duplication and inconsistency of approach between different API specifications, 3GPP has considered the development of a CAPIF that includes common aspects applicable to any northbound service APIs. The functional model for the CAPIF developed by 3GPP is organized into functional entities to describe a functional architecture which enables an API invoker to access and invoke service APIs. The CAPIF functional model can be adopted by any 3GPP functionality providing service APIs. Each of the functional entities may be implemented on hardware such as a network node or a computer.

Figure 2:
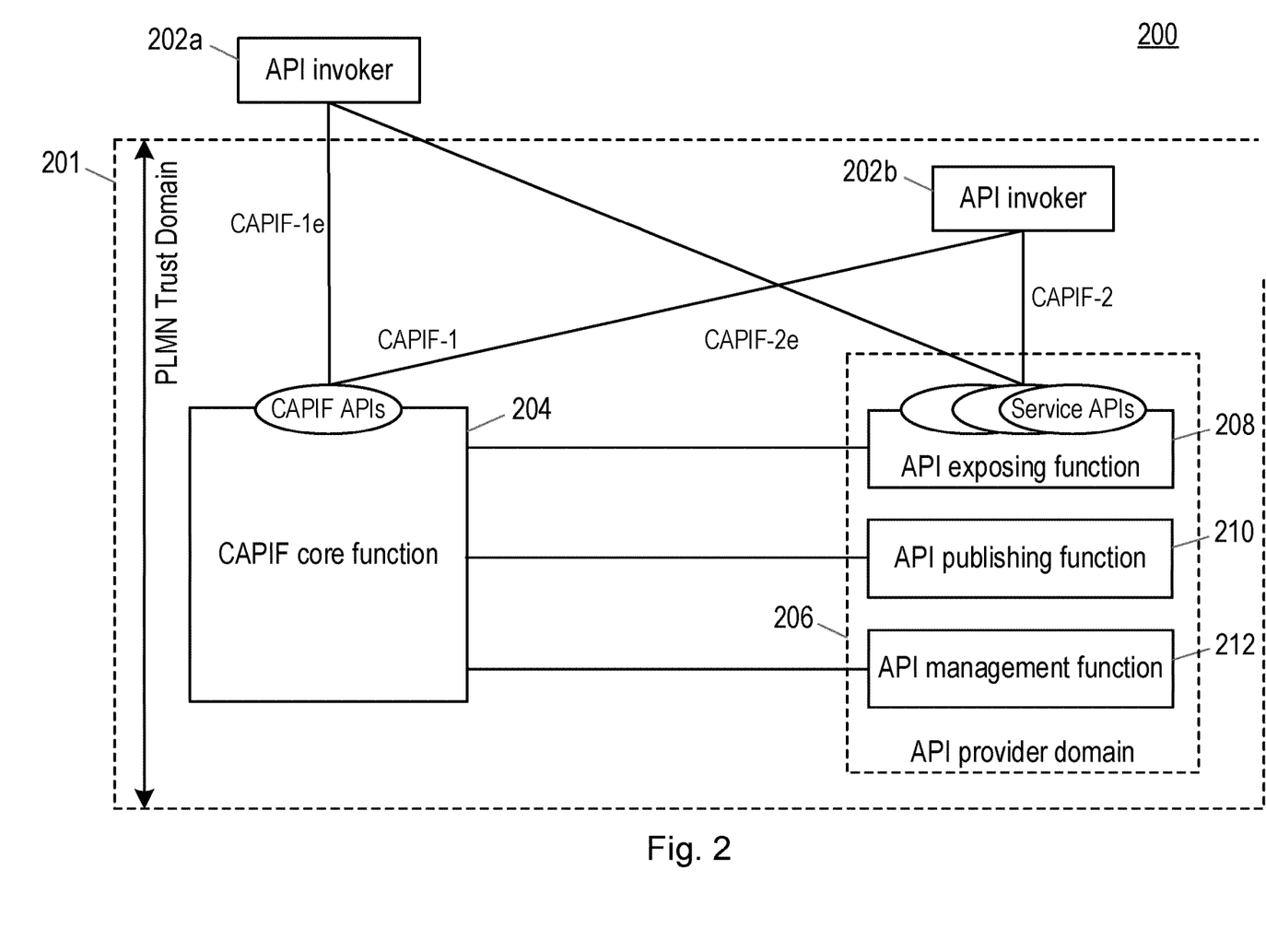
FIG. 2 is a functional model of a common application programming interface framework (CAPIF) according to embodiments of the disclosure.

FIG. 2 shows a reference point based functional model for a CAPIF 200 such as that described above. The CAPIF 200 may be hosted within an operator network such as a public land mobile network (PLMN).

FIG. 2 shows two API invokers: a first API invoker 202a, outside a trust domain 201 of the PLMN; and a second API invoker 202b, inside the trust domain 201. It will be apparent that an API invoker may be situated within or without the PLMN trust domain 201. For example, the API invoker may be provided by a 3rd party application provider who has a service agreement with the PLMN operator. The CAPIF 200 comprises a CAPIF core function 204, which exposes a set of CAPIF APIs to the API invokers 202. An API provider domain 206 provides a particular service which is to be accessed by the API invokers 202. Within the API provider domain 206, there is provided an API exposing function 208, an API publishing function 210, and an API management function 212. Each of these functions interfaces with the CAPIF core function 204 via respective interfaces CAPIF-3, CAPIF, 4 and CAPIF-5. The API exposing function (AEF) 208 exposes the service APIs to the API invokers 202.

In a reference point based model, the API invoker 202b within the PLMN trust domain 201 interacts with the CAPIF via interface CAPIF-1 (with the CAPIF core function 204) and interface CAPIF-2 (with the AEF 208). The API invoker 202a outside the PLMN trust domain 201 interacts with the CAPIF via interface CAPIF-1e (with the CAPIF core function 204) and interface CAPIF-2e (with the AEF 208).

The API invokers 202 may support one or more of the following capabilities:
 Supporting authentication by providing the API invoker identity and other information required for authentication of the API invoker 202;
 Supporting mutual authentication with CAPIF 200;
 Obtaining authorization prior to accessing the service API;
 Discovering service APIs information; and
 Invoking the service APIs.

The CAPIF core function 204 may support one or more of the following capabilities:
 Authenticating the API invokers 202 based on the API identity and other information required for authentication of the API invoker;
 Supporting mutual authentication with the API invoker 202;
 Providing authorization for the API invoker 202 prior to accessing the service API;
 Publishing, storing and supporting the discovery of service APIs information;
 Controlling the service API access based on PLMN operator configured policies;
 Storing the logs for the service API invocations and providing the service API invocation logs to authorized entities;
 Charging based on the logs of the service API invocations;
 Monitoring the service API invocations;
 Onboarding and offboarding API invokers;
 Storing policy configurations related to CAPIF and service APIs;
 Support accessing the logs for auditing (e.g. detecting abuse); and
 Supports publishing, discovery of service APIs information with another CAPIF core function in CAPIF interconnection.

The API exposing function 208 is the provider of the service APIs and is also the service communication entry point of the service API to the API invokers 202. The API exposing function may support one or more of the following capabilities:
 Authenticating the API invoker based on the identity and other information required for authentication of the API invoker provided by the CAPIF core function;
 Validating the authorization provided by the CAPIF core function; and
 Logging the service API invocations at the CAPIF core function.

The API publishing function 210 enables the API provider to publish the service APIs information in order to enable the discovery of service APIs by API invoker 202. For that purpose, the API publishing function 210 may support publishing service API information of the API provider to the CAPIF core function 204.

The API management function 212 enables the API provider to perform administration of the service APIs. The API management function may support one or more of the following capabilities:
 Auditing service API invocation logs received from the CAPIF core function 204;
 Monitoring events reported by the CAPIF core function 204;
 Configuring the API provider policies to the CAPIF core function 204;
 Monitoring the status of the service APIs;
 Onboarding new API invokers and offboarding API invokers 202; and Registering and maintaining registration information of the API provider domain functions on the CAPIF core function 204.

CAPIF event subscription and notification is described in 3GPP TS 32.222, section 8.8. The CAPIF core function 204 enables a subscribing network entity (e.g., the API invoker 202, the AEF 208, the API publishing function 210, the API management function 212, etc) to subscribe to and unsubscribe from CAPIF events such as availability events of service APIs, change in service API information, monitoring service API invocations, API invoker onboarding events, etc.

Currently in TS 29.222, the following events are defined.

| Enumeration value | Description | Applicability |
| --- | --- | --- |
| SERVICE_API_AVAILABLE | Events related to the availability of service APIs after the service APIs are published. | |
| SERVICE_API_UNAVAILABLE | Events related to the unavailability of service APIs after the service APIs are unpublished. | |
| SERVICE_API_UPDATE | Events related to change in service API information | |
| API_INVOKER_ONBOARDED | Events related to API invoker onboarded to CAPIF | |
| API_INVOKER_OFFBOARDED | Events related to API invoker offboarded from CAPIF | |
| SERVICE_API_INVOCATION_SUCCESS | Events related to the successful invocation of service APIs | |
| SERVICE_API_INVOCATION_FAILURE | Events related to the failed invocation of service APIs | |
| ACCESS_CONTROL_POLICY_UPDATE | Events related to the update for the access control policy related to the service APIs | |
| ACCESS_CONTROL_POLICY_UNAVAILABLE | Events related to the unavailability of the access control policy related to the service APIs | |
| API_INVOKER_AUTHORIZATION_REVOKED | Events related to the revocation of the authorization of API invokers to access the service APIs. | |

However, the ability of the subscribing network entity to filter those events (i.e., to receive only those events of interest to it) is extremely restricted. Similarly, the ability of the CAPIF core function to inform subscribing network entities of events which are of particular interest is also limited. For example, a subscribing network entity may subscribe to receive events of a particular event type, such as Service API Available or Service API Unavailable. However, in doing so the subscribing network entity must subscribe to receive notifications of all events of this type. In addition, the subscribing network entity must take further action in order to discover which Service API has become available or unavailable. Similarly, a subscribing network entity may subscribe to receive Service API Update events. The subscribing network entity will then receive notifications of all events of this type, whenever the Service API is updated. The subscribing network entity must take further action to discover which part of the Service API has been updated.

The present disclosure proposes an improved solution for CAPIF event subscription and notification, which provides for more efficient usage of network resources (e.g., sending fewer, more relevant messages between network entities). As an exemplary example, the solution may be applied to the communication system shown in FIG. 1. The functional description of the entities shown in FIG. 1 is specified in clause 6 of 3GPP TS 23.501, which is incorporated herein by reference in its entirety. Alternatively or additionally, the solution may be applied to the framework shown in FIG. 2. The functional description of the entities shown in FIG. 2 is specified in clause 6 of 3GPP TS 23.222 v 16.4.0, which is incorporated herein by reference in its entirety.

Note that within the context of this disclosure, the term terminal device (or UE) used herein may also be referred to as, for example, access terminal, mobile station, mobile unit, subscriber station, or the like. It may refer to any (a stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node (or network entity) in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Figure 3:
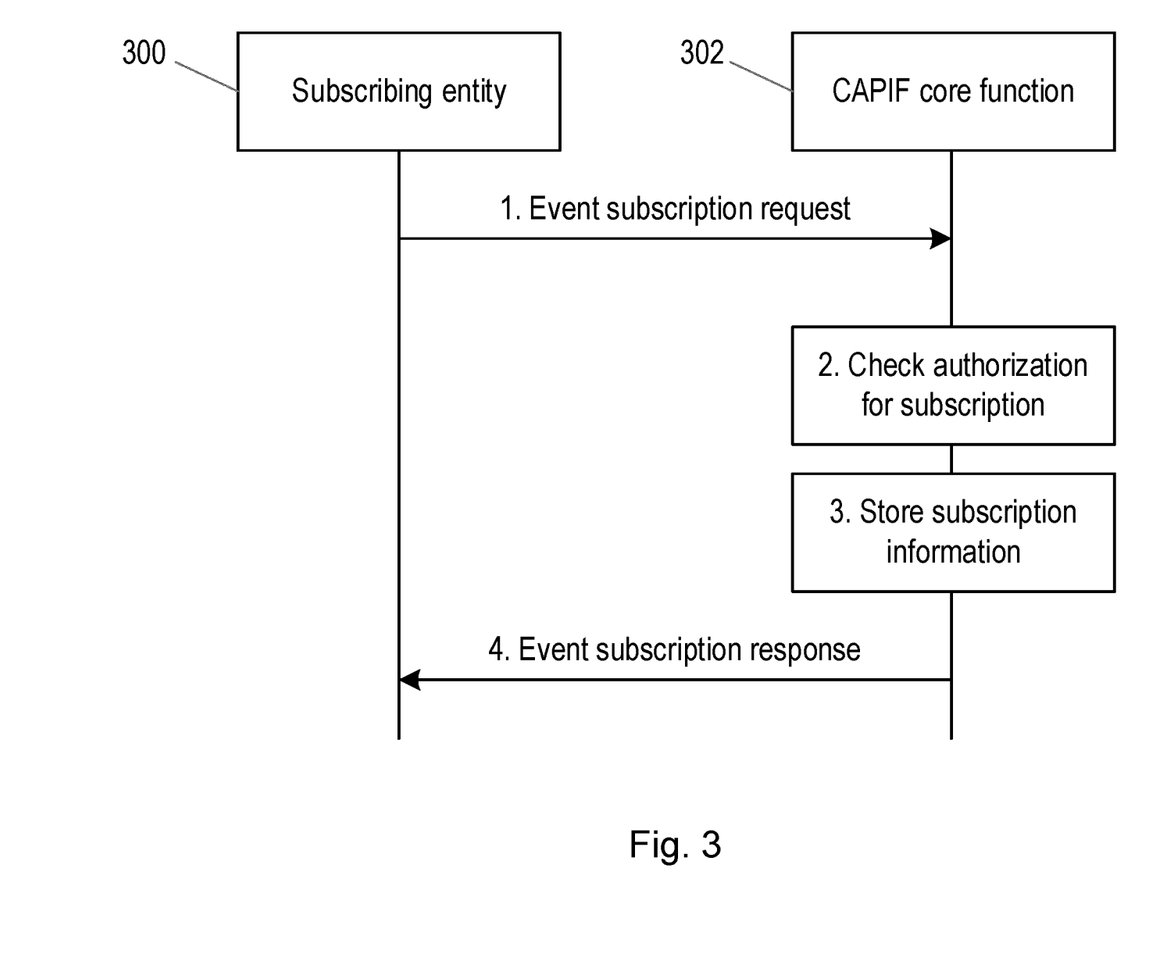
FIG. 3 is a signaling diagram according to embodiments of the disclosure.

FIG. 3 is a signaling diagram according to embodiments of the disclosure, by which a subscribing network entity 300 may subscribe to receive event notifications from a CAPIF core function 302. The CAPIF core function 302 may correspond to the core function 204 described above with respect to FIG. 2. The subscribing network entity 300 may be any network entity which has an interest in receiving CAPIF event notifications, such as an API invoker, an AEF, an API publishing function, or an API management function, for example.

In step 1, the subscribing entity 300 sends an event subscription request message to the CAPIF core function 302 in order to subscribe to receive notifications of events. The event subscription message may include some or all of the information set out in the following table:

invoker IDs and/or API identifications. In this way, the subscribing entity 300 may only receive notifications of updates to the access control policy for certain API invokers (as well as the APIs for which the access control policy is updated). In a further example, where the message requests subscription to events of the type SERVICE_API_INVOCATION_SUCCESS or SERVICE_API_INVOCATION_FAILURE, the message may comprise an indication of one or more API invoker IDs, AEF identifiers and/or API IDs. In this way, the subscribing entity 300 may only receive notifications of service API invocation success or failure for one or more particular API invokers, and/or one or more particular API exposure functions, and/or particular Service APIs.

In a further example, where the message requests subscription to events of the type SERVICE_API_AVAILABLE, SERVICE_API_UNAVAILABLE or SERVICE_API_UPDATE, the message may comprise an indication of one or more API IDs. Thus the subscribing entity 300 receives notifications only about the availability or update of certain Service APIs.

| Information element | Status | Description |
| --- | --- | --- |
| Identity information | M | The information to determine the identity of the subscribing entity |
| Event criteria | M | The event criteria include event type information like failure API invocation event, new API available event, API version change event, API location change event, etc and other query information like service API identifier, service API name, etc. |
| Notification reception information | O | The information of the subscribing entity for receiving the notifications for the event. |

Thus the message may comprise an identity of the subscribing entity, the type of the event to which the subscribing entity is subscribing, and a destination universal resource indicator (URI) to which event notifications should be sent.

According to embodiments of the disclosure, the event subscription request message may additionally include an event filter comprising additional criteria to be met for the event to be notified to the subscribing entity. The additional criteria may include the identities of one or more network entities involved in the event. For example, the subscribing entity may be interested in receiving event notifications which concern only a particular network entity or group of network entities. In that case, the event filter may comprise a list of one or more network entities which are to be involved in the event if that event is to be reported to the subscribing entity in an event notification. Events which do not involve the listed network entity or entities are not reported to the subscribing entity. Examples of entities which might be specified in the event filter include API exposure functions and API invokers.

The type of network entity listed in the event subscription request message may vary depending on the type of event indicated in the event subscription request message. For example, if the message requests subscription to events of the type API_INVOKER_ONBOARDED or API_INVOKER_OFFBOARDED, the event subscription request message may include an indication of one or more API invoker IDs. In this way, the subscribing entity 300 will be notified of particular API invokers being onboarded (e.g., registered with the CAPIF core function 302) or offboarded (e.g., unregistered with the CAPIF core function 302). In another example, if the message requests subscription to events of the type ACCESS_CONTROL_POLICY_UPDATE, the message may comprise an indication of one or more API By providing additional filtering information, the subscribing entity 300 ensures that it receives only notifications of events which are of interest to it. Network resources are conserved as fewer event notifications are transmitted by the CAPIF core function 302 (see also FIG. 4 below), and resources are also conserved in the subscribing entity as it has to handle fewer event notifications.

According to embodiments of the disclosure, the event subscription request message may additionally or alternatively comprise an event reporting requirement specifying the circumstances under which the CAPIF core function 302 is to report event notifications to the subscribing entity 300.

For example, in one embodiment the event reporting requirement may relate to the timing of the event notifications. Such an event reporting requirement may specify whether the event notifications are to be periodic or not. In the former case, the event reporting requirement may additionally specify the duration of the period between event notifications. In the latter case, the event reporting requirement may specify whether events are to be reported upon detection of the event (i.e., as and when the events are detected, rather than periodically) or after a defined delay.

The event reporting requirement may specify a number of event notifications to be reported before expiry or termination of the subscription. For example, where the number is set to one, the subscription expires after the first event notification is sent.

The event reporting requirement may comprise an indication of a length of time that the CAPIF core function 302 is to monitor for the events specified in the event subscription request message. The length of time may be indicated by specifying a time at which the subscription ends, or a duration of time for which the subscription is active, for example.

In step 2, upon receiving the event subscription request from the subscribing entity 300, the CAPIF core function 302 checks for the relevant authorization for the event subscription (stored in the CAPIF core function 302).

In step 3, if the authorization in step 2 is successful, the CAPIF core function 302 stores the subscription information. The subscription information may be associated with a subscription identifier, allowing the subscription to be identified in later communications (e.g., in event notifications, when unsubscribing, etc).

In step 4, the CAPIF core function 302 sends an event subscription response to the subscribing entity 300 indicating successful establishment of the subscription.

Figure 4:
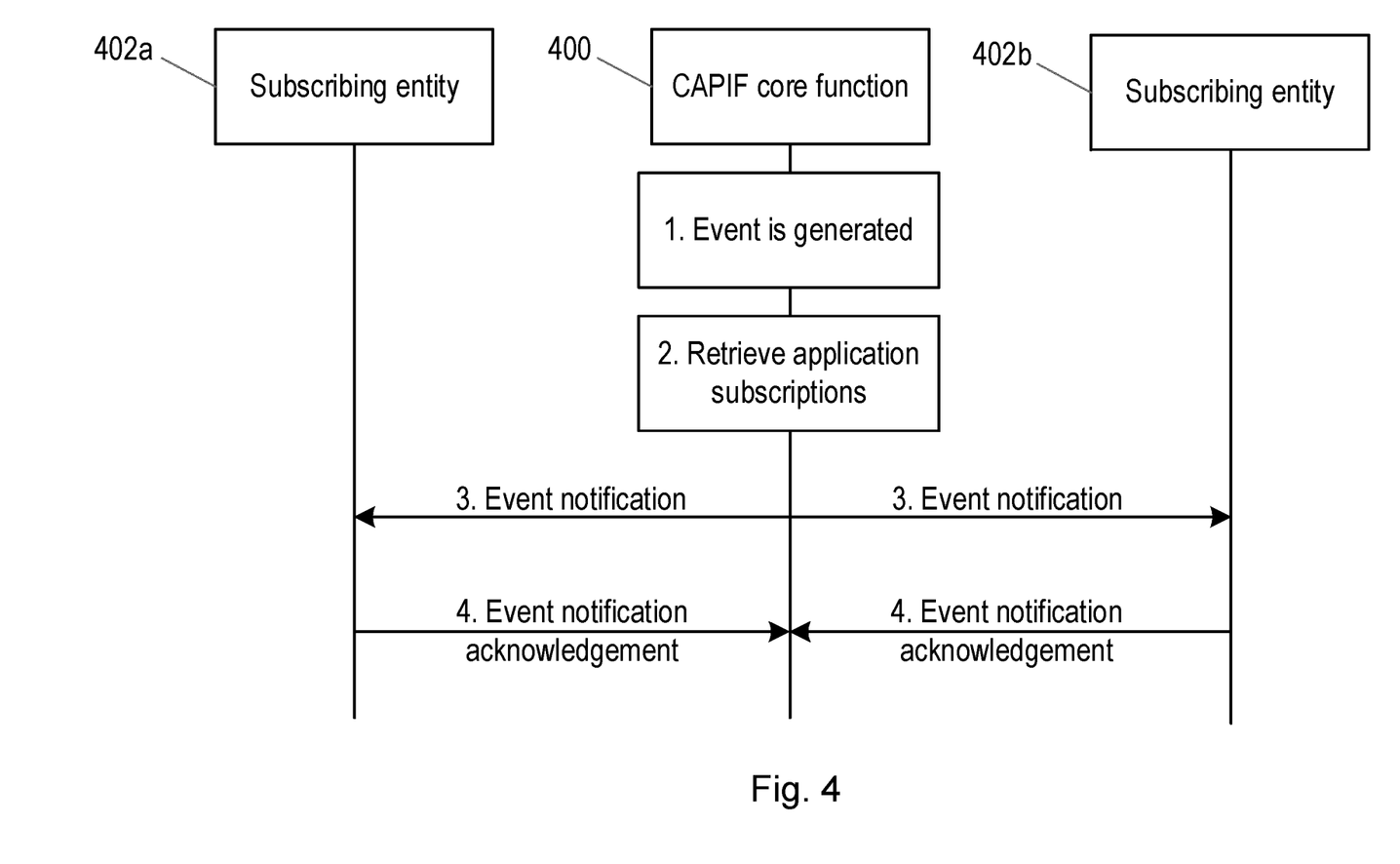
FIG. 4 is a signaling diagram according to further embodiments of the disclosure.

FIG. 4 is a signaling diagram according to embodiments of the disclosure, by which a CAPIF core function 400 sends notifications of events to one or more subscribing network entities 402 (two subscribing network entities 402a and 402b are illustrated). The CAPIF core function 400 may correspond to the core function 204 described above with respect to FIG. 2, or the core function 302 described above with respect to FIG. 3. The subscribing network entities 402 may be any network entity which has an interest in receiving CAPIF event notifications, such as an API invoker, an AEF, an API publishing function, or an API management function, for example. The subscribing entities 402 have previously subscribed to receive event notifications from the CAPIF core function 400, e.g., by following the signaling described above with respect to FIG. 3.

In step 1, the CAPIF core function 400 generates or detects events to be consumed by the subscribing entity(s). The table below sets out the types of events which are currently supported by the CAPIF core function 400. Additional event types may be added in the future, and those skilled in the art will appreciate that embodiments of the disclosure are not limited to the ten event types listed below.

In step 2, for the generated event, the CAPIF core function 400 retrieves the list of corresponding subscriptions. Thus the CAPIF core function 400 searches through its list of stored subscription information to identify those subscribing entities which are to receive event notifications for the event detected in step 1. This may comprise the CAPIF core function 400 identifying those subscribing entities which have subscribed to receive event notifications for the particular type of event detected in step 1, for example.

Where the subscribing entities followed the signaling set out in FIG. 3, the CAPIF core function 400 has additional criteria to identify those subscribing entities which are to receive event notifications. Thus the CAPIF core function 400 may identify those subscribing entities which have subscribed to receive event notifications for the particular type of event detected in step 1 and the particular network entity or entities involved in the event. For example, where the detected event is of the type API_INVOKER_ONBOARDED or API_INVOKER_OFFBOARDED, the CAPIF core function 400 may identify those subscribing entities which have subscribed to receive notifications about the particular API invoker which has been onboarded or offboarded. Where the detected event is of the type ACCESS_CONTROL_POLICY_UPDATE, the CAPIF core function 400 may identify those subscribing entities which have subscribed to receive notifications about the particular API invoker for which the access control policy has been updated (and/or the particular API). Where the detected event is of the type SERVICE_API_INVOCATION_SUCCESS or SERVICE_API_INVOCATION_FAILURE, the CAPIF core function 400 may identify those subscribing entities which have subscribed to receive notifications about the particular API invoker which has succeeded or failed in invoking a Service API, the particular API exposure function involved in the success or failure of the invocation, and/or the particular Service API which was successfully or unsuccessfully invoked.

In step 3, the CAPIF core function 400 sends event notifications to all the subscribing entity(s) 402 identified in step 2, i.e., those subscribing entities that have subscribed for the event matching the criteria. If a notification reception information is available as part of the subscribing entity event subscription, then the notification reception information is used by the CAPIF core function 400 to send event notifications to the subscribing entity.

A notification about an event is thus sent to a subscribing entity if the event criteria in the related subscription match

| Enumeration value | Description | Applicability |
| --- | --- | --- |
| SERVICE_API_AVAILABLE | Events related to the availability of service APIs after the service APIs are published. | |
| SERVICE_API_UNAVAILABLE | Events related to the unavailability of service APIs after the service APIs are unpublished. | |
| SERVICE_API_UPDATE | Events related to change in service API information | |
| API_INVOKER_ONBOARDED | Events related to API invoker onboarded to CAPIF | |
| API_INVOKER_OFFBOARDED | Events related to API invoker offboarded from CAPIF | |
| SERVICE_API_INVOCATION_SUCCESS | Events related to the successful invocation of service APIs | |
| SERVICE_API_INVOCATION_FAILURE | Events related to the failed invocation of service APIs | |
| ACCESS_CONTROL_POLICY_UPDATE | Events related to the update for the access control policy related to the service APIs | |
| ACCESS_CONTROL_POLICY_UNAVAILABLE | Events related to the unavailability of the access control policy related to the service APIs | |
| API_INVOKER_AUTHORIZATION_REVOKED | Events related to the revocation of the authorization of API invokers to access the service APIs. | | the corresponding attributes of the event content. The event notification message may comprise one or more of the fields identified in the table below:

| Information element | Status | Description |
| --- | --- | --- |
| Subscription identifier | M | The unique identifier of the event subscription |
| Event identifier | M | The unique identifier for the event. For the list of events, refer subclause 8.8.6 |
| Event related information | M | The event related information (e.g. time at which the event originated, location of event) |
| Event content | M | The content of the event information. |

According to embodiments of the disclosure, the event notification message may comprise an indication of additional information concerning the event (e.g., in the Event Content information element, or an attribute such as the "eventDetail" attribute). The additional information may be included responsive to receipt of the additional event filter information in the subscription process described above with respect to FIG. 3. Alternatively, the additional information may be included regardless of the method used to subscribe to receive event notifications.

The type of information which is included may vary according to the type of event which is being notified. According to some embodiments of the disclosure, the additional information may comprise indications of the identities of one or more network entities involved in the event. For example, where the event is API_INVOKER_ONBOARDED or API_INVOKER_OFFBOARDED, the event notification message may comprise an indication of the identities of the one or more API invokers which have been onboarded or offboarded. Where the event is ACCESS_CONTROL_POLICY_UPDATE, the event notification message may comprise an indication of the identities of the one or more API invokers whose access control policy has been updated. The event notification message may additionally comprise an indication of how the access control policy has been changed. Where the event is SERVICE_API_INVOCATION_SUCCESS or SERVICE_API_INVOCATION_FAILURE, the event notification message may comprise an indication of the identities of one or more API invokers or API exposure functions involved in the Service API invocation success or failure. For example, the event notification message may comprise API invocation logs containing such information.

In further examples, where the event is SERVICE_API_AVAILABLE or SERVICE_API_UNAVAILABLE, the event notification message may comprise an indication of the identities of those Service APIs which are available or unavailable. Where the event is SERVICE_API_UPDATE, the event notification message may comprise an indication of the identities of those Service APIs which are updated, and/or an indication of how the Service APIs have been updated.

The event notification messages may further be sent in step 3 in accordance with any reporting requirements specified during the subscription process (e.g., as described above with respect to FIG. 3). For example, where the event reporting requirement specifies periodic reporting of event notifications, the event notification message(s) may be sent only once the next periodic transmission is due. Alternatively, the event notification message(s) may be sent immediately, or a delay after detection of the event in step 1.

In step 4, the subscribing entities 402 send event notification acknowledgement messages to the CAPIF core function 400 for the event notification received.

Figure 5:
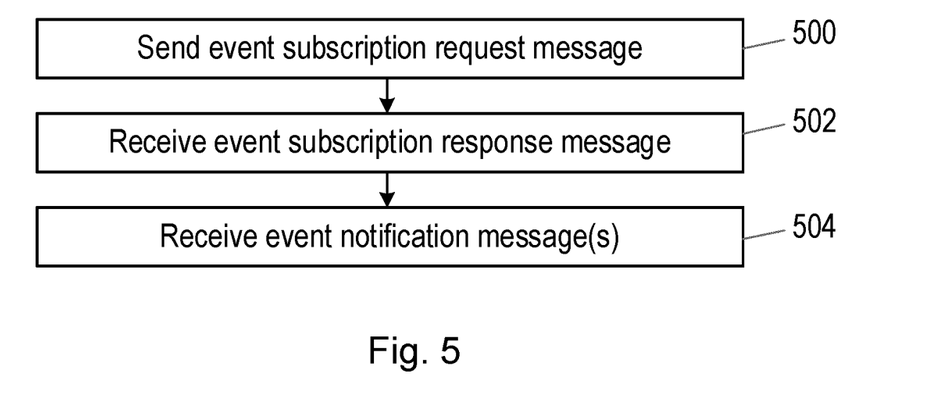
FIG. 5 is a flowchart of a method implemented at a subscribing network entity according to embodiments of the disclosure.

FIG. 5 is a flowchart of a method implemented at a subscribing network entity according to embodiments of the disclosure. The subscribing network entity may be any network entity which has an interest in receiving CAPIF event notifications, such as an API invoker, an AEF, an API publishing function, or an API management function, for example. The method of FIG. 5 may correspond in some respects to the actions of the subscribing network entities 300, 402 described above with respect to FIGS. 3 and 4.

In step 500, the subscribing entity sends an event subscription request message to a CAPIF core function. Step 500 may correspond substantially to step 1 described above with respect to FIG. 3.

In step 502, the subscribing entity receives an event subscription response message from the CAPIF core function, indicating successful establishment of the subscription requested in step 500 (assuming that the subscribing entity has the relevant authorization). This step may correspond substantially to step 4 described above with respect to FIG. 3.

In step 504, the subscribing entity receives an event notification message from the CAPIF core function. This step may correspond substantially to step 3 described above with respect to FIG. 4.

Figure 6:
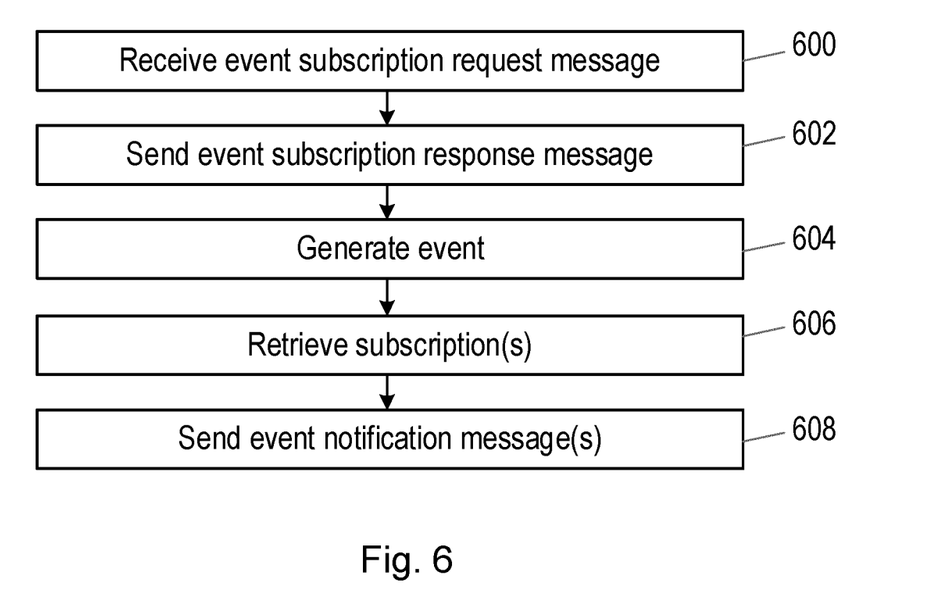
FIG. 6 is a flowchart of a method implemented at a CAPIF core function according to further embodiments of the disclosure.

FIG. 6 is a flowchart of a method implemented at a CAPIF core function according to further embodiments of the disclosure. The method of FIG. 6 may correspond in some respects to the actions of the CAPIF core functions 302, 400 described above with respect to FIGS. 3 and 4.

In step 600, the CAPIF core function receives an event subscription request message from a subscribing network entity. Step 600 may correspond substantially to step 1 described above with respect to FIG. 3.

In step 602, the CAPIF core function sends an event subscription response message to the subscribing entity, indicating successful establishment of the subscription requested in step 600 (assuming that the subscribing entity has the relevant authorization). This step may correspond substantially to step 4 described above with respect to FIG. 3.

In step 604, the CAPIF core function generates or detects an event. This step may correspond to step 1 described above with respect to FIG. 4.

In step 606, the CAPIF core function retrieves subscriptions which match the event detected in step 604, e.g., the CAPIF core function identifies those subscribing entities which have subscribed to receive notifications of events matching the event detected in step 604. This step may correspond substantially to step 2 described above with respect to FIG. 4.

In step 608, the CAPIF core function sends event notification messages to those subscribing entities identified in step 606. This step may correspond substantially to step 3 described above with respect to FIG. 4.

Figure 7:
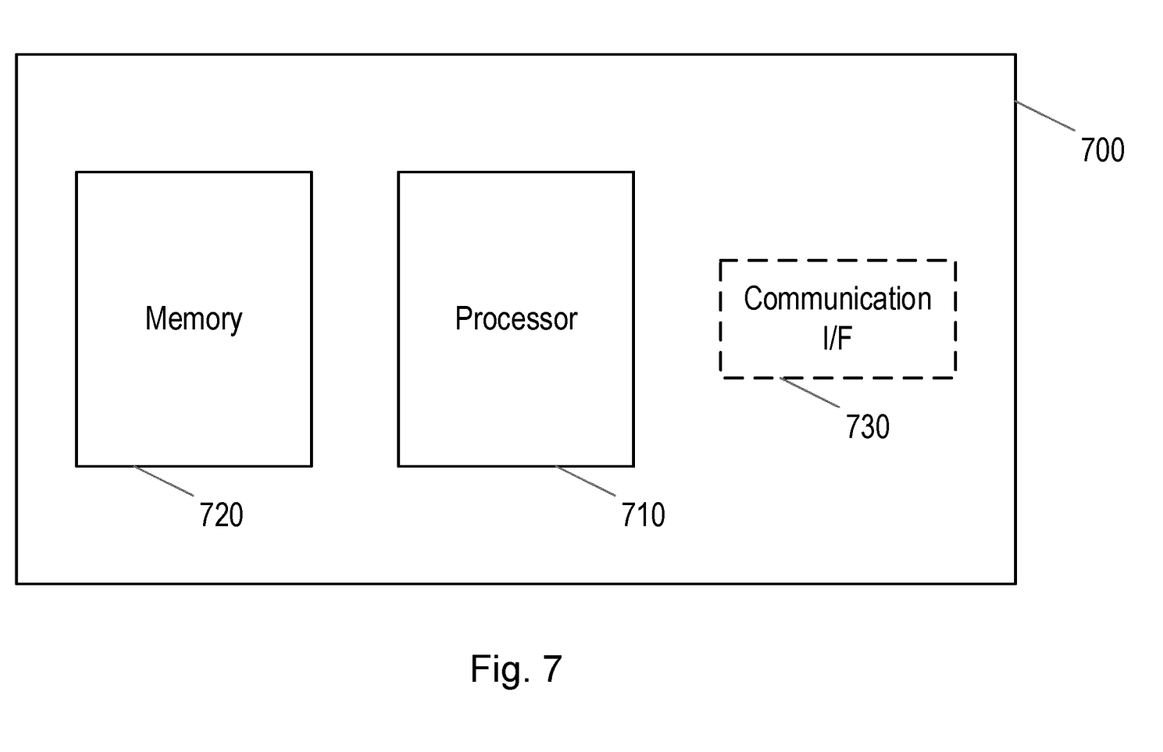
FIG. 7 is a block diagram showing an apparatus suitable for use in practicing some embodiments of the disclosure.

FIG. 7 is a block diagram showing an apparatus 700 suitable for use in practicing some embodiments of the disclosure. For example, any one of the subscribing network entities 300, 402 and CAPIF core functions 302, 400 described above may be implemented through the apparatus 700. The apparatus 700 may additionally or alternatively be configured to perform either of the methods set out above with respect to FIGS. 5 and 6. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

Figure 8:
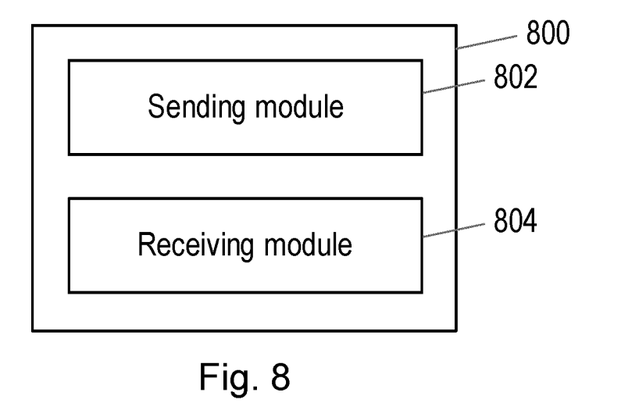
FIG. 8 is a block diagram showing a subscribing network entity according to an embodiment of the disclosure.

FIG. 8 is a block diagram showing a subscribing network entity 800 according to an embodiment of the disclosure. As shown, the subscribing network entity 800 comprises a sending module 802 and a receiving module 804. The sending module 802 may be configured to send an event subscription request message to a CAPIF core function. The event subscription request message comprises an indication of an event filter, to be utilized by the CAPIF core function for filtering event notifications to be sent to the subscribing network entity. The event filter comprises an identity of one or more network entities associated with events to be notified to the subscribing network entity. In an embodiment, the receiving module 804 is configured to receive an event notification message from the CAPIF core function, notifying the subscribing network entity 800 of an event. The event notification message comprises an indication of identities of one or more network entities associated with the event. The modules described above may be implemented by hardware, or software, or a combination of both.

Figure 9:
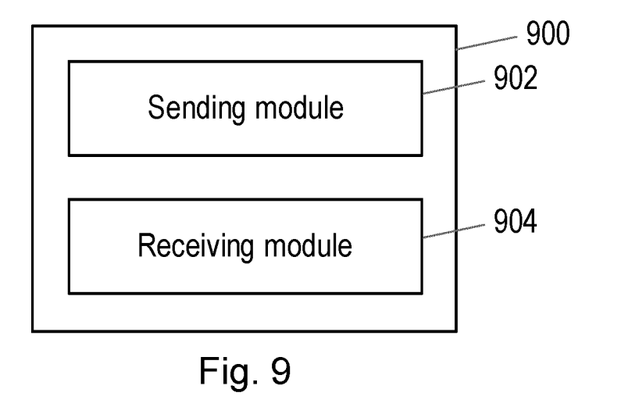
FIG. 9 is a block diagram showing a subscribing network entity according to a further embodiment of the disclosure.

FIG. 9 is a block diagram showing a subscribing network entity 900 according to an embodiment of the disclosure. As shown, the subscribing network entity 900 comprises a sending module 902 and a receiving module 904. The sending module 902 may be configured to send an event subscription request message to a CAPIF core function. The event subscription request message comprises an event subscription request message to the CAPIF core function, the event subscription request message comprising an indication of an event reporting requirement. In an embodiment, the receiving module 904 is configured to receive an event notification message from the CAPIF core function, notifying the subscribing network entity 900 of an event. The event notification message may be send in accordance with the event reporting requirement. The modules described above may be implemented by hardware, or software, or a combination of both.

Figure 10:
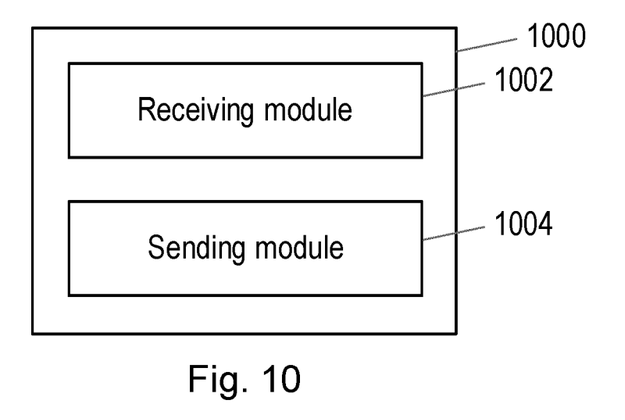
FIG. 10 is a block diagram showing a CAPIF core function according to an embodiment of the disclosure.

FIG. 10 is a block diagram showing a CAPIF core function 1000 according to an embodiment of the disclosure.

As shown, the CAPIF core function 1000 comprises a receiving module 1002 and a sending module 1004. The sending module 1004 may be configured to send an event notification message to one or more subscribing entities, the event notification message notifying the one or more subscribing entities of an event. The event notification message comprises an indication of an identity of one or more network entities associated with the event. In an embodiment, the receiving module 1002 may be configured to receive an event subscription request message from a subscribing network entity of the one or more network entities. The event subscription message may comprise an indication of an event filter, to be utilized by the CAPIF core function 1000 for filtering event notifications to be sent to the subscribing network entity. The event filter may comprise identities of one or more network entities associated with events to be notified to the subscribing network entity. Additionally or alternatively, the event subscription request message may comprise an indication of an event reporting requirement. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method performed by a subscribing network entity for subscribing to event notifications from a common application programming interface framework, CAPIF, core function in a telecommunications network, the method comprising:

sending an event subscription request message to the CAPIF core function, the event subscription request message comprising an indication of an event filter, the event filter to be utilized by the CAPIF core function for filtering event notifications to be sent to the subscribing network entity, the event filter comprising: an identity of one or more network entities associated with events to be notified to the subscribing network entity; and an indication of a type of event to be notified to the subscribing network entity.

2. The method according to claim 1, wherein the event filter further comprises an identity of one or more API.

3. The method according to claim 1, wherein the one or more network entities associated with events to be notified to the subscribing network entity comprise one or more of: one or more API invokers; and one or more API exposure functions.

4. The method according to claim 1, wherein the type of event comprises an API Invoker Onboarded event or an API Invoker Offboarded event; or wherein the type of event comprises an Access Control Policy Update event; or wherein the type of event comprises a Service API Invocation Success event or a Service API Invocation Failure event.

5. The method according to claim 4, wherein the one or more network entities associated with events to be notified to the subscribing network entity comprise one or more API invokers.

6. The method according to claim 5, wherein the one or more network entities associated with events to be notified to the subscribing network entity comprise one or more API exposure functions.

7. A subscribing network entity, comprising:

at least one processor; and at least one memory, the at least one memory containing instructions executable by the at least one processor, whereby the NEF entity is operative to:

send an event subscription request message to a CAPIF core function, the event subscription request message comprising an indication of an event filter, the event filter to be utilized by the CAPIF core function for filtering event notifications to be sent to the subscribing network entity, the event filter comprising: an identity of one or more network entities associated with events to be notified to the subscribing network entity; and an indication of a type of event to be notified to the subscribing network entity.

* * * * *